Feb. 7, 1950 J. M. BOYLE ET AL 2,496,435

APPARATUS FOR SORTING AND/OR SELECTING RECORD CARDS

Filed March 14, 1944 8 Sheets-Sheet 1

INVENTORS
James M. Boyle
BY John W. Thompson

Blair, Curtis + Hayward
ATTORNEYS

Feb. 7, 1950 J. M. BOYLE ET AL 2,496,435

APPARATUS FOR SORTING AND/OR SELECTING RECORD CARDS

Filed March 14, 1944 8 Sheets-Sheet 2

INVENTORS
James M. Boyle
BY John W. Thompson

Blair, Curtis + Hayward
ATTORNEYS

APPARATUS FOR SORTING AND/OR SELECTING RECORD CARDS

Filed March 14, 1944 8 Sheets-Sheet 3

INVENTORS
James M. Boyle
BY John W. Thompson
Blair, Curtis + Hayward
ATTORNEYS

Feb. 7, 1950 J. M. BOYLE ET AL 2,496,435

APPARATUS FOR SORTING AND/OR SELECTING RECORD CARDS

Filed March 14, 1944 8 Sheets-Sheet 4

INVENTORS
James M. Boyle
BY John W. Thompson

Blair, Curtis + Hayward
ATTORNEYS

APPARATUS FOR SORTING AND/OR SELECTING RECORD CARDS

INVENTORS
James M. Boyle
BY John W. Thompson
Blair, Curtis + Hayward
ATTORNEYS

INVENTORS
James M. Boyle
BY John W. Thompson
Blair, Curtis + Hayward
ATTORNEYS

INVENTORS
James M. Boyle
BY John W. Thompson
Blair, Curtis + Hayward
ATTORNEYS

APPARATUS FOR SORTING AND/OR SELECTING RECORD CARDS

Filed March 14, 1944 8 Sheets-Sheet 8

INVENTORS
James M. Boyle
BY John W. Thompson
Blair, Curtis & Hayward
ATTORNEYS

Patented Feb. 7, 1950

2,496,435

UNITED STATES PATENT OFFICE 2,496,435

APPARATUS FOR SORTING AND/OR SELECTING RECORD CARDS

James M. Boyle, South Norwalk, Conn., and John W. Thompson, New York, N. Y.

Application March 14, 1944, Serial No. 526,412

7 Claims. (Cl. 209—110)

Figure 1:
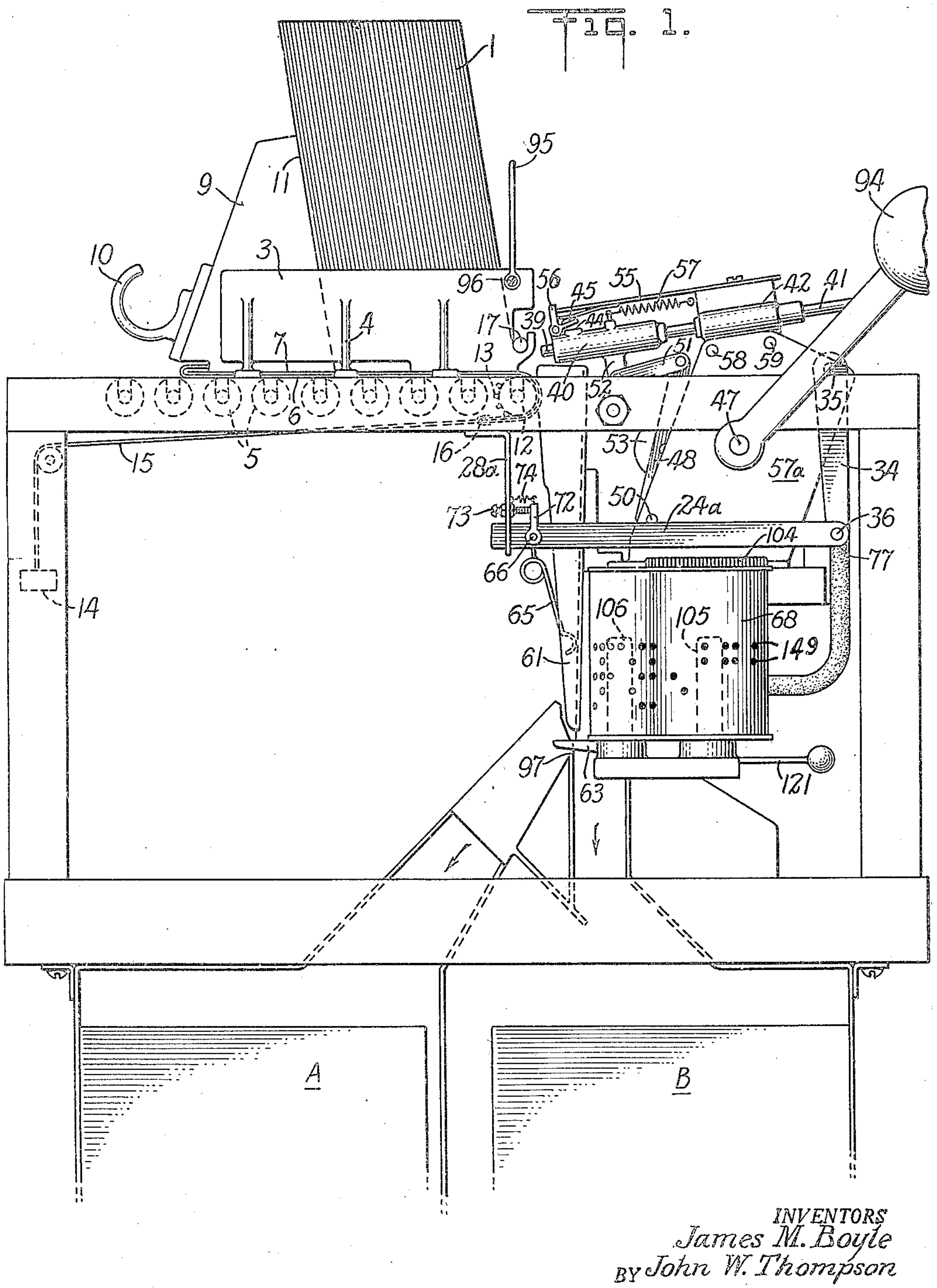

The present invention relates to method of and apparatus for sorting and/or selecting or otherwise utilizing record cards by reference to identifying indicia, informative data, or the like carried by the cards.

In a known form of apparatus for a similar purpose, as that shown in Hollerith's Patent No. 526,129 of September 18, 1894, for example, a record card provided with perforations is employed in connection with pneumatic sensing means to selectively actuate the lid of a receptacle into which the sensed card is dropped by hand, or to operate a counting device. Comparable results are also achieved by various other electrically or mechanically actuated devices.

In known forms of apparatus designed for similar purposes and wherein perforated paper cards are used, the sensing and sorting means involve relatively complex electrical and/or mechanical devices. Although large numbers of such machines of various types have been and are currently employed, they are relatively expensive both in manufacture and operation, which heretofore has tended to limit their practical use to large enterprises.

One object of the present invention has been to provide card sorting apparatus, or the like, which may be embodied in relatively small sizes and simple designs at low manufacturing cost, as compared with known forms of machines for a similar purpose; and are therefore, available to small enterprises as well as large.

A further object has been to provide card sorting or selecting apparatus of the type wherein a distinctive sorting or selecting of the cards is effected as the immediate result of applying a suitable force, as a differential in air pressure, i. e. pressure (positive) and/or vacuum (negative), thereto when said cards are in sensing position, as distinguished from card sorters, or the like as Hollerith's device above referred to, wherein air pressure is selectively applied to actuate one or more appendant devices which may produce some required end result on or by reference to said cards but do not operate directly thereon or effect any change in the condition thereof at the sensing position to effect sorting of the cards.

A further object has been to provide a card sorter, or the like, wherein sorting or selection is effected in part by sensing means including a key member, as a card, a sheet, or the equivalent, which is easily and quickly prepared to present any required sensing control pattern, as perforations, and is adapted to be readily positioned for sensing; or which may be perforated in situ, for effective sensing control in relation to the air pressure differential supply and a record card when the latter is in sensing position.

A further object has been to provide means for releasably holding a record card and a suitable key member or card in proper relation during sensing and means for discharging the record card in one direction or another from sensing position, depending on the effect of the sensing directly on the record as determined by the sensing control pattern of the key card and its relation to the pattern of the record card being sensed.

A further object of the invention has been to provide record card feeding, sensing and controlling means operative rapidly and in properly timed relation to bring cards successively into sensing position; to apply a controlled air pressure differential selectively operative through a key member to each card so positioned; and to determine the delivery of said card from its initial sensing position to one destination or another as a result of applying said selectively operative air pressure differential thereto.

A further object has been to provide a compact easily portable card sorting machine with relatively few moving parts, many of which can be made of non-metallic materials such as plastics, compressed fibre and/or other durable and easily formable materials.

A further object of the invention has been to provide a card sensing machine which is capable of sorting, making selections, and/or other utilization, based on a practically unlimited number of different qualifying, identifying or distinguishing features or data set up on cards in terms of perforations but which does not require an impracticably large number of sensing elements, as relays, switches, plug cords or the like, or any complex setting or interconnection of numerous parts.

A further object of the invention has been to provide effective feeding or picker mechanism for separating one record card at a time from a stack of cards.

A further object of the invention has been to provide, as part of the sensing mechanism, a key card or sheet holding device whereby, if desired, said key card or sheet of paper or other suitable material may receive the required key perforations or sensing control perforation pattern made by a suitable punch, for example, while said key card is in sensing position, as distinguished from the case where the key card or sheet is prepunched or perforated before being positioned for sensing. Where perforating is effected in situ, the sensing devices also preferably include suitable means for removing, as by blowing, sucking out, or otherwise removing particles punched or displaced from the key cards or sheets; and thus to clear the air chamber or air pressure differential manifold of such particles which might otherwise interfere with effective sensing operation.

A further object of the invention has been to provide record card feeding, guiding and holding means, in operative relation to key card holding devices, air pressure and/or vacuum control means and actuating devices operable by hand or otherwise, whereby complete cycles of feeding and selection or other utilization may be effectively produced in rapid succession by a simple turning movement.

A further object of the invention has been to provide a card sorting or selecting device employing a key card, or the like, and wherein air pressure differential may be utilized both to control the selection of a record and/or to produce some additional useful result, as counting, for example, by the actuation of suitable devices in cooperation with predetermined perforation patterns in the record cards.

Other objects of the invention and advantages in its utilization will be apparent from the following specification and the appended drawings illustrative of one embodiment and modifications thereof and in which—

Figure 2:
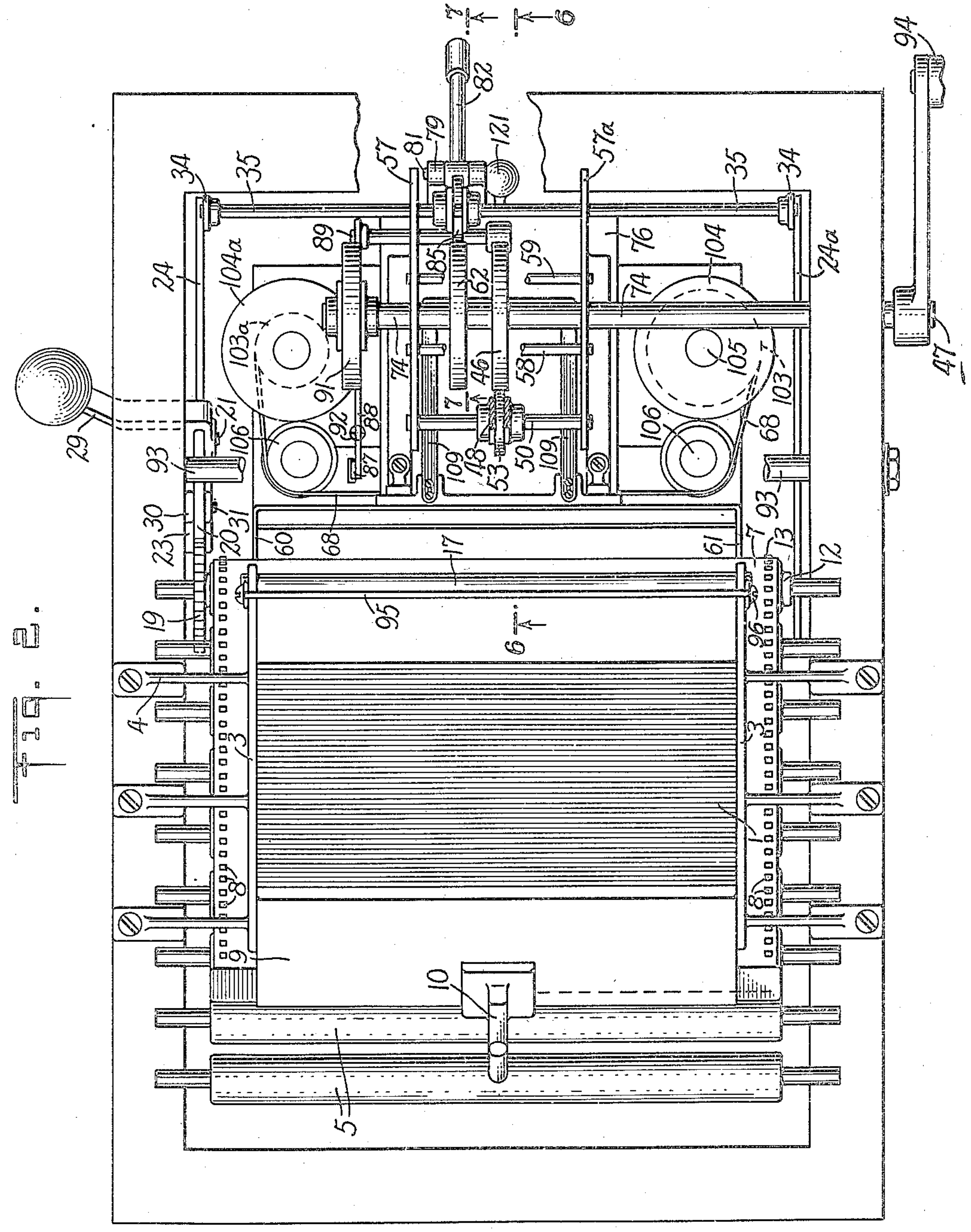
Figures 3, 4, 5:
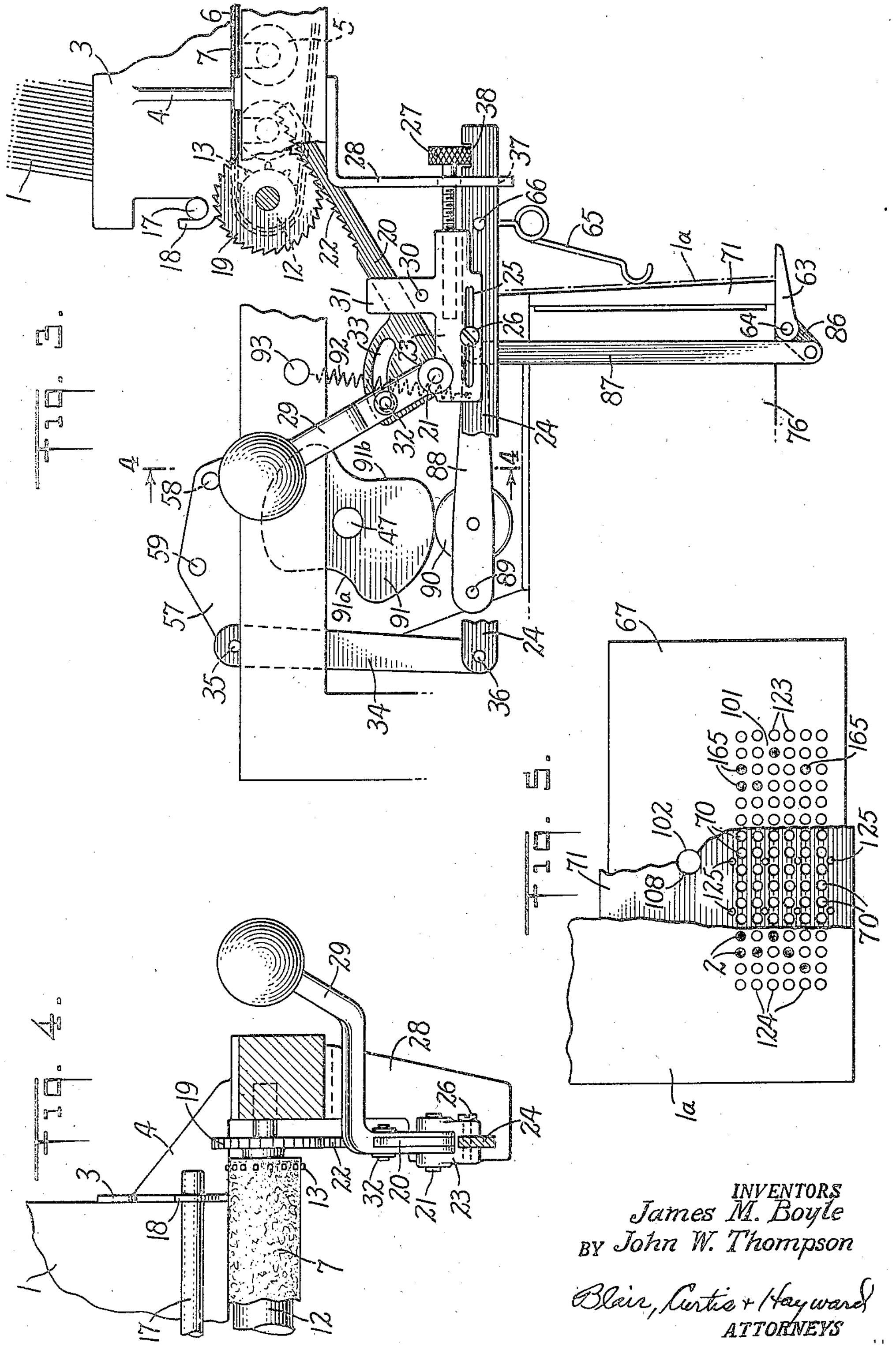
Figure 6:
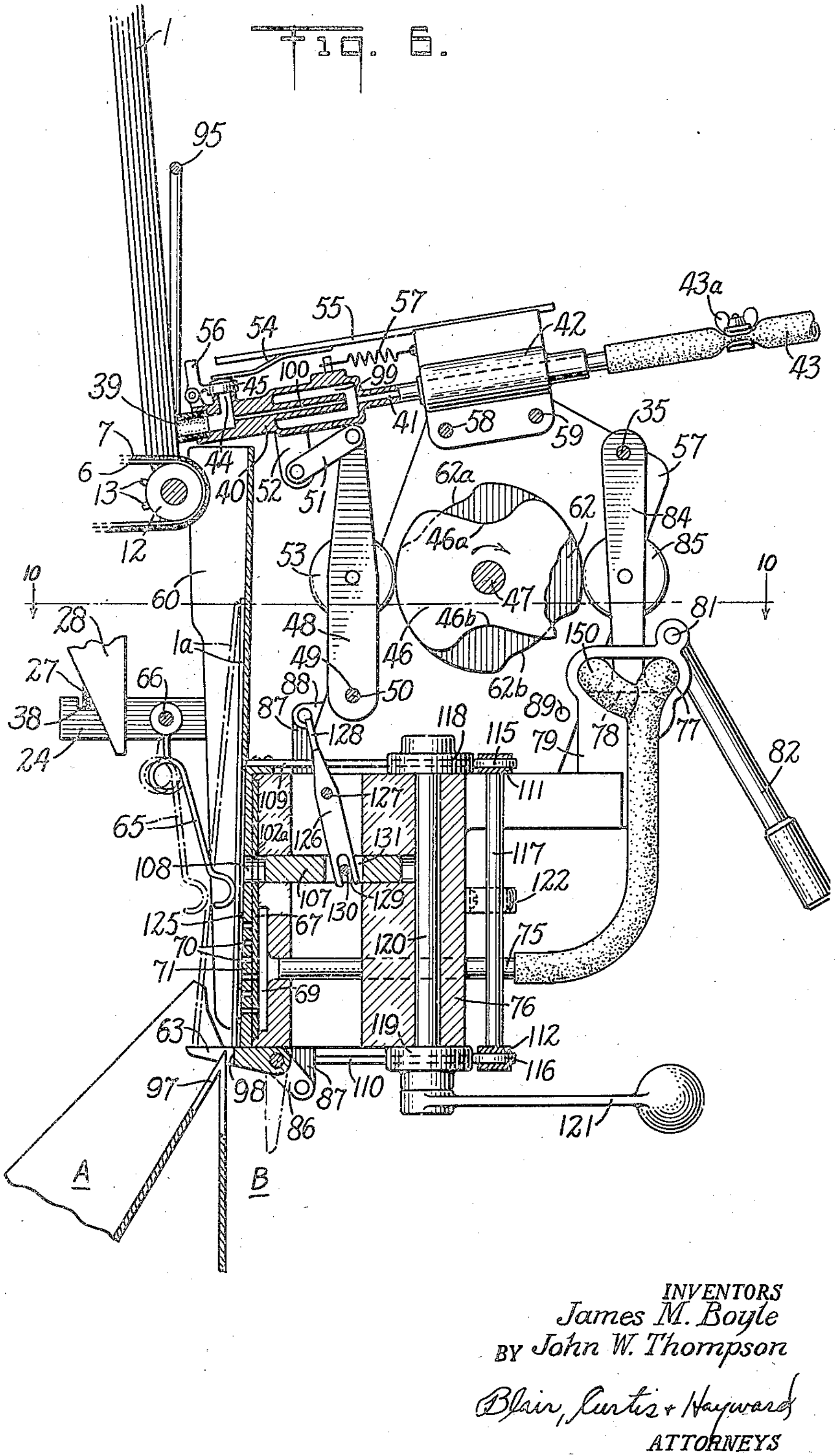
Figures 7, 8, 9:
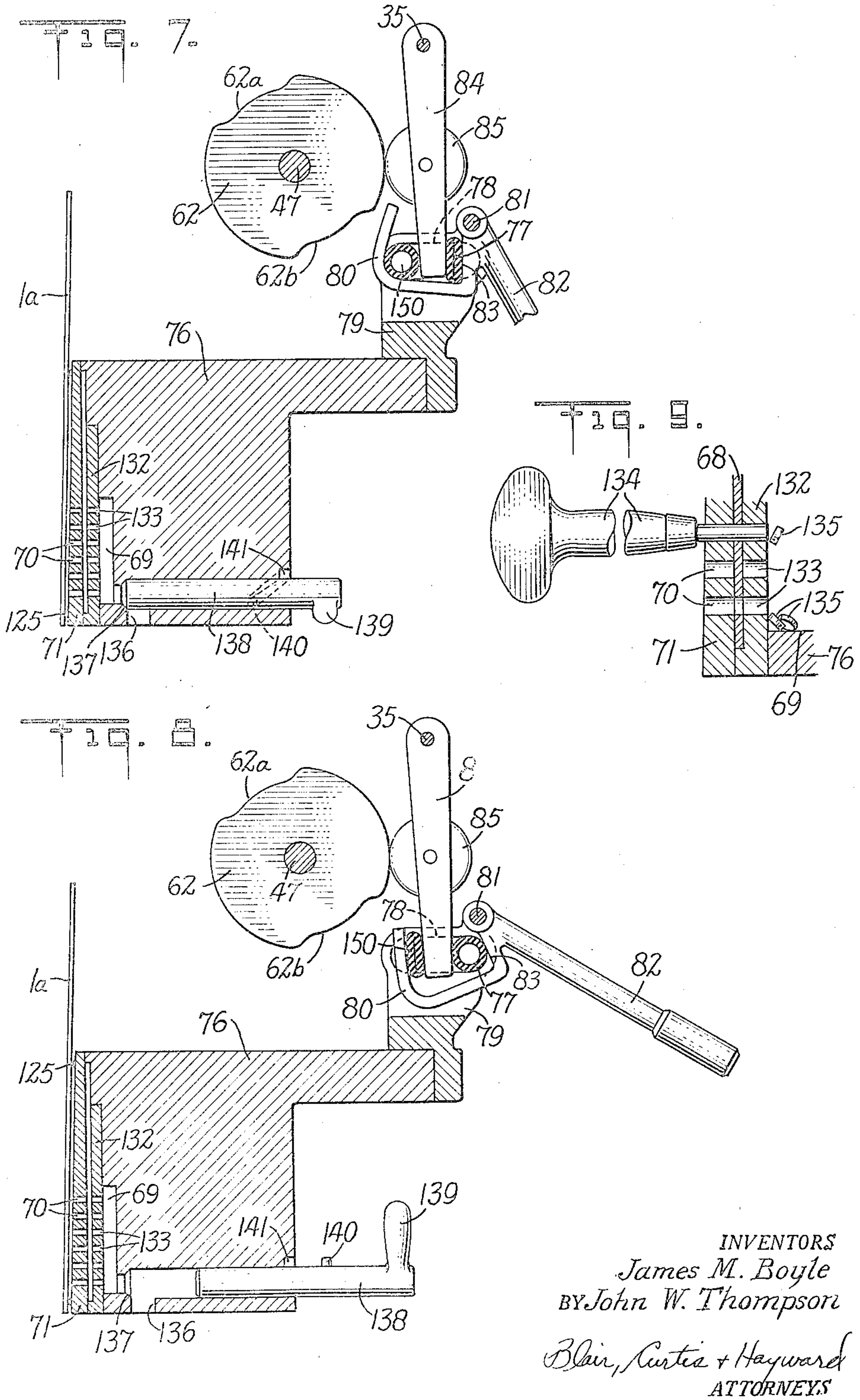
Figure 10:
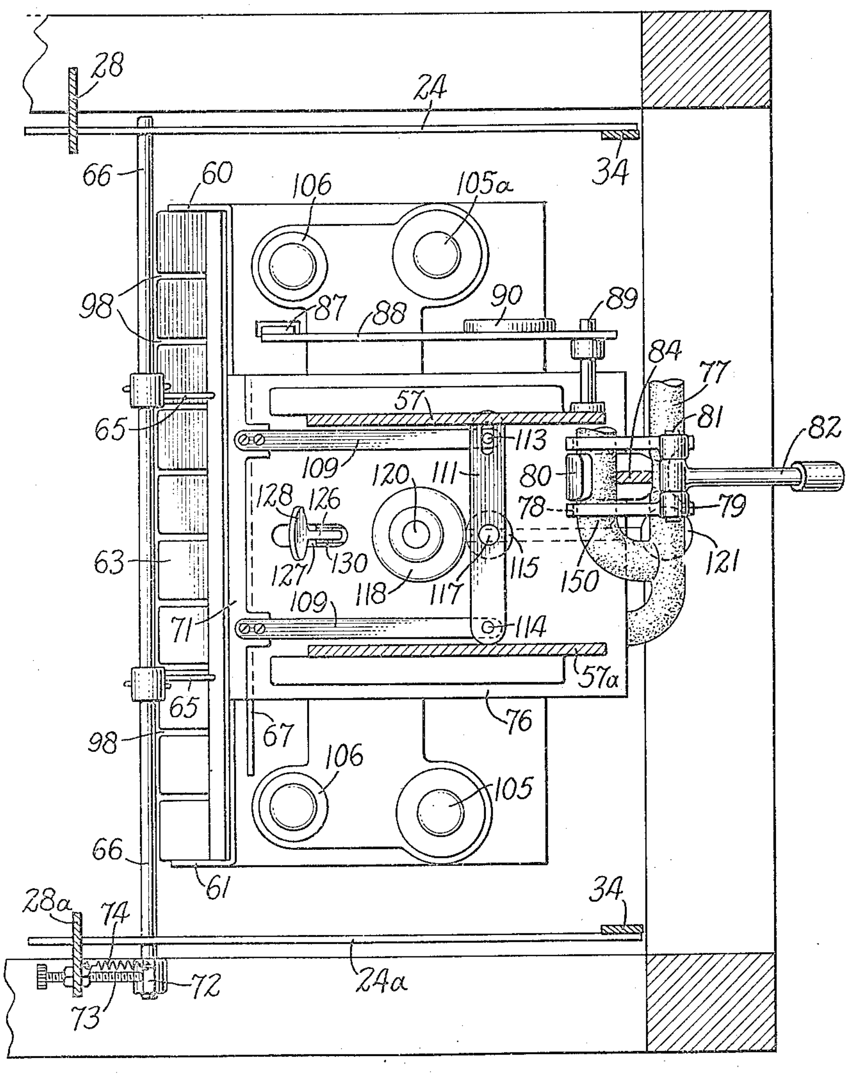
Figure 11:
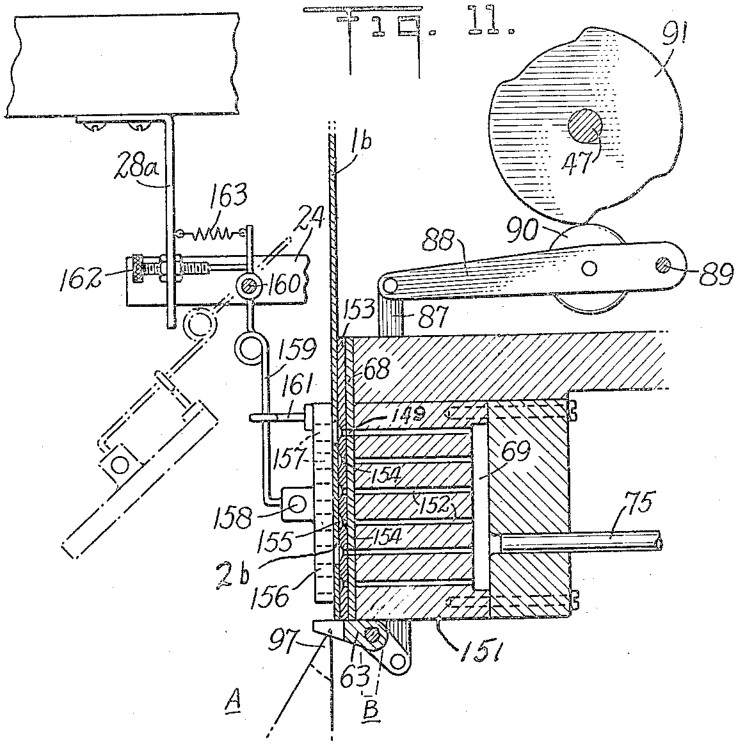
Figure 12:
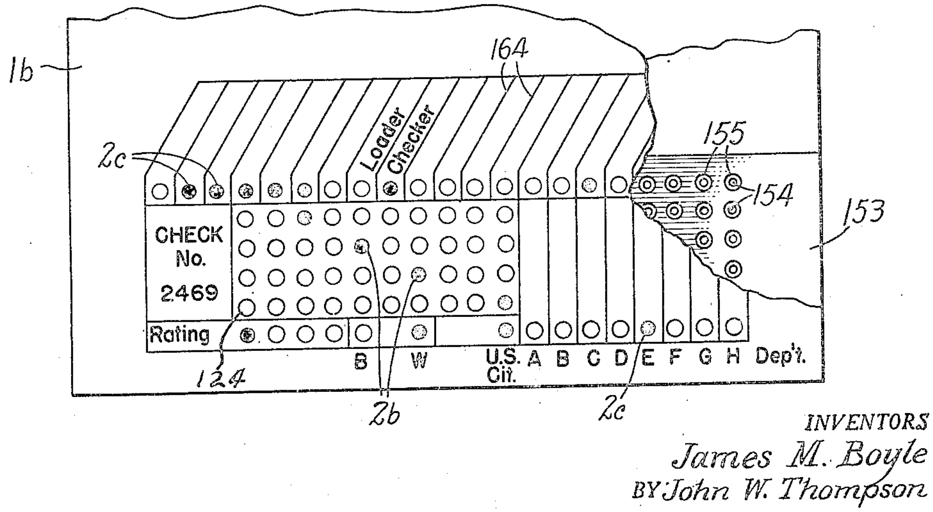
Figures 13, 14, 15, 16:
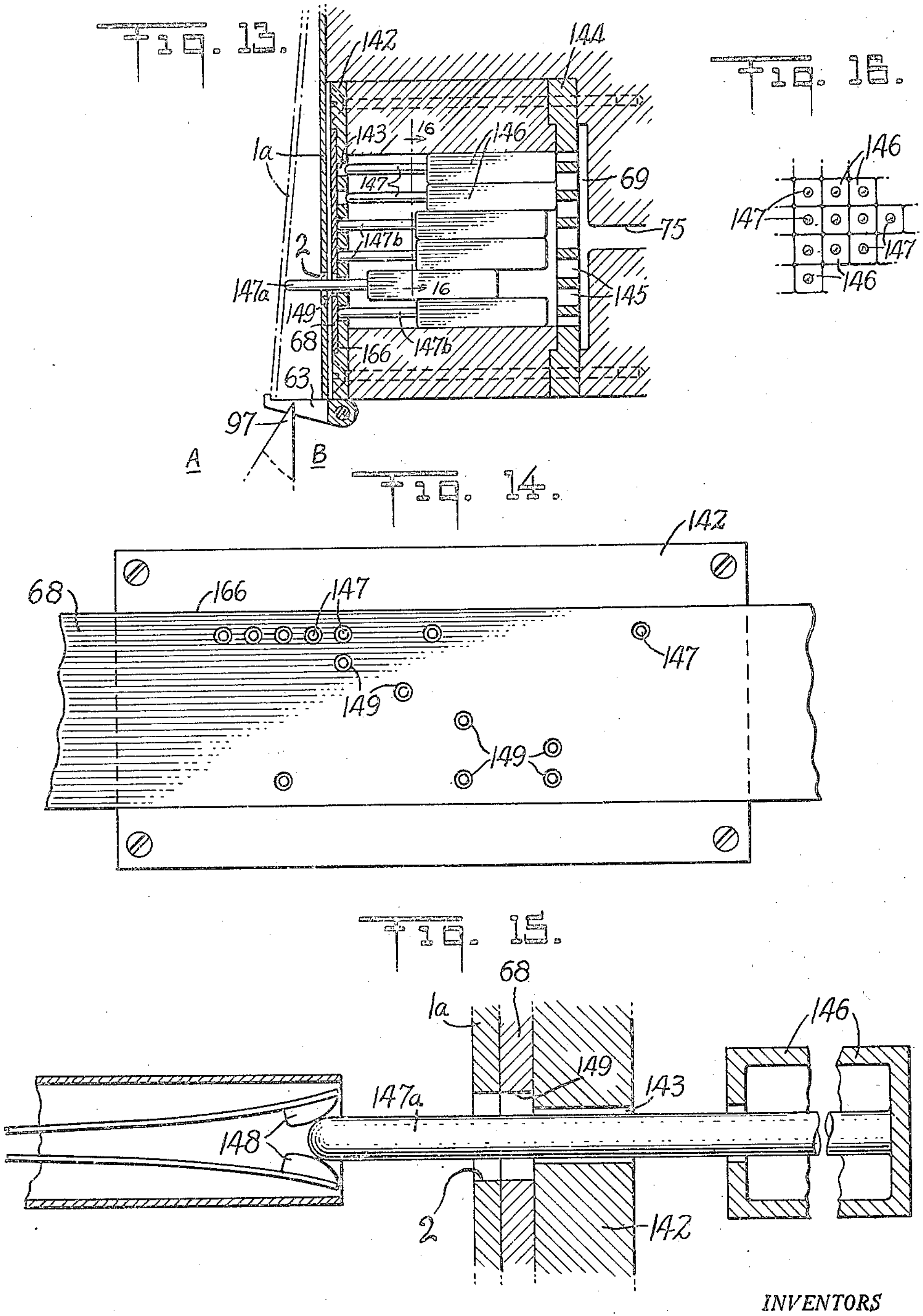

Figure 1 is a side elevation;

Figure 2, a top plan view;

Figure 3, a detail fragmentary view in side elevation of parts including adjustable mechanism for effecting step by step feed of a stack of record cards and portions of devices for discharging the sensed cards;

Figure 4, a detail view, partly in vertical section, on the line 4—4 of Figure 3, of the stack feed parts there shown;

Figure 5, a fragmentary view in elevation showing a portion of one form of record card, a portion of a form of face plate, and a portion of one form of sensing control or key member in sensing relation;

Figure 6, a longitudinal vertical section on the line 6—6 of Figure 2;

Figure 7, a longitudinal vertical section on the line 7—7 of Figure 2 illustrating air pressure differential and blow out control devices;

Figure 8, a similar view of the parts shown in Figure 7 but with some in different operative relation;

Figure 9, a punch or perforating tool in process of punching a perforation pattern in a key card or sheet when the latter is in operative sensing position in a sensing mechanism which has a suitable die plate arranged as shown in Figures 7 and 8;

Figure 10, a view partly in horizontal section and partly in plan on the line 10—10 of Figure 6;

Figure 11, a fragmentary view, partly in vertical section, showing a modified form of sensing means adapted for operation by suction;

Figure 12, a fragmentary view in elevation showing a portion of another form of record card and a form of face plate as embodied in the modification shown in Figure 11;

Figure 13, a detail view in longitudinal vertical section illustrating a modification of a portion of the sensing mechanism of the machine wherein air pressure is employed in connection with plungers and a key member, both to control the selection of record cards and/or to effect other useful results, as counting for example;

Figure 14, a detail view in elevation illustrating a portion of the sensing mechanism shown in Figure 13, and a key strip in operative relation thereto;

Figure 15, an enlarged detail view partly in section showing the switch portion of an electrical circuit with said switch in operative relation to a portion of the sensing apparatus of Figure 13; and Figure 16, a fragmentary view in vertical section on the line 16—16 of Figure 13, illustrating the arrangement of air pressure actuated plungers resting freely one on another.

*Record card*

Card sorting apparatus according to the present invention is conveniently employed in connection with cards of well known or conventional types, or with record cards, 1, 1*a*, 1*b*, or the like as shown in Figures 1, 5 and 12, wherein a portion of card 1*a* or 1*b*, for example, has spaces or areas identified by markings, as 124, to receive suitable indicia, as perforations 2, 2*b*, 2*c*, and other portions to receive a record of informative data expressed in any desired terms, depending on the use for which the record cards are intended. In some cases, for example, as in the card 1*b*, Figure 12, the informative data may appear in writing, typewriting, printing, or otherwise in spaces defined by suitable markings, as 164; and the card identification may be expressed in terms of arbitrarily located indicia, as perforations 2*b*. In other cases, Figure 12, the informative data, or part thereof, may also be entered in terms of perforations 2*c*, some or all of which may also provide means of card identification either alone or combined with a conventional identification pattern and, therefore, be employable directly in sorting or selecting. For purposes of the following description, record cards of the illustrated type will be referred to; and for convenience and clarity, it will be assumed that in said cards, some or all of the perforations are employed primarily as means capable of cooperating with a control or key member to facilitate the separation, selection, or sorting from a group or stack all cards bearing a given perforation pattern from all other cards therein presenting different perforation patterns.

In some known or conventional types of perforated record cards, the perforation spaces occur in horizontal rows and vertical columns so arranged as to leave substantial areas around each perforation. In other forms, the perforations appear as slots or cuts of different shapes extending through edge portions of the cards. In the illustrated cards, the perforation receiving spaces are in vertical columns and horizontal rows. Said rows may, however, be arranged in staggered relation, whereby a relatively small area of a given card or a card of relatively small total area, as a standard library indexing card approximately 3″ x 5″, will provide spaces for more perforations, or will permit more perforations in a given area, as compared to cards having the conventional arrangements of perforation spaces above referred to. The apparatus to be described is sufficiently flexible in design possibilities to permit the use therewith of cards presenting conventional arrangements of perforation spaces, as well as any other desired or preferred arrangement suitable for sensing.

*Holder or hopper for stack of record cards*

Referring now to Figures 1 and 6 of the drawings, a stack of record cards 1 to be sorted is arranged in a holder or hopper in operative relation to a picker device by which one card at a time is separated from the stack and put in motion toward a sensing mechanism to be described.

In the embodiment shown, the holder or hopper for the stack of record cards 1 is arranged at a level above the sensing mechanism so that said cards may be moved one at a time by gravity from assembled position in the stack to sensing position. Said hopper includes fixed side walls 3 supported by brackets 4, Figures 1 and 2, secured to spaced opposed frame members. A plurality of rolls 5, journaled between said opposed frame members, provide a support for a stack supporting floor in the form of a composite band comprising a flexible metal strip 6 as its under layer and a strip 7 of felt, or other suitable material, as its upper layer upon which the stack of record cards normally rests when positioned for sorting, or the like. Said metal strip 6 is provided with spaced rows of perforations 8 for a purpose to be explained.

One end portion of said composite band is secured to an under portion of a block 9 which rests on said band between side walls 3. A finger piece 10 is mounted on one exposed face of block 9 which is provided with an obliquely disposed face 11 against which the stack of cards 1 bears when positioned in the hopper with their bottom edges supported on the felt layer or strip 7.

The other or free end portion of said band passes over and part way around a driving roll 12 provided with sprocket teeth 13, Figure 4, which engage with the perforations 8 in metal strip 6. A weight 14 is secured at one end of a cord or wire 15, the other end of which is fastened to the free end edge of said band at 16 to exert a steady pull thereon. A stop rod 17 is removably supported on brackets 18 to retain the stack of record cards in assembled relation when the machine is not in operation and is removed to permit feeding of said cards singly from the stack during sensing. Another stop rod 95 extending across the stack and shown as spaced from the leading card thereof is provided to prevent accidental or undue displacement or tipping forward of the cards during sensing. Said rod 95 may be in the form of a U-shaped bail with its ends secured to the walls 3 by a screw 96, Figure 1.

In operation, starting with the parts above described in the relative positions shown in Figure 1, stop rod 17 is removed, and said feed band is advanced step by step in movements approximating the thickness of a card by means to be described, until all the cards have been released one by one to sensing position. Block 9 may be returned to starting position by pulling it back (left Figure 1) by means of finger piece 10; and a fresh stack of cards may then be inserted in the hopper for the next sensing or sorting operation.

*Record card feeding devices*

In the embodiment shown, record cards are released or fed one by one from the stack by coordinated operation of suitable stack advancing means and card picking means.

*Stack feeding or advancing mechanism*

As seen more clearly in Figures 2, 3 and 4, the flexible stack supporting band and block 9 thereon are advanced step by step by rotation of drive roll 12 in the counterclockwise direction, Figure 3. To thus rotate said roll 12, the latter is fitted with a ratchet wheel 19 driven by endwise movement in one direction of an arm 20 pivoted at 21 and having pawl teeth 22. Said arm 20 is supported by pivot 21 on a saddle 23 adjustable longitudinally on a reciprocatable bar 24 having one end slidably supported in a guide slot 37 in the web of a bracket 28. Saddle 23 has a slot 25 through which a locking screw 26 extends to secure said saddle in any desired position of adjustment in relation to bar 24.

For making precision adjustment of said saddle thereon, an adjusting screw 27 is arranged with its head portion engaging a notch 38 in the upper edge of bar 24. The shank of said adjusting screw 27 extends freely through said slot 37 in said bracket web 28 and its threaded end engages a longitudinally disposed threaded recess opening through one end of saddle 23. Thus, by turning the knurled head of screw 27 in notch 38 when locking screw 26 is slacked off, saddle 23 may be precisely positioned along bar 24.

An arm 29 weighted at its free end is bifurcated at its lower end and pivoted at 21 to straddle an enlarged sector shaped portion of arm 20. The purpose of weighted arm 29 is to bias the pawl portion of arm 20 in a direction toward ratchet 19. A stop 30 between guide posts 31 of saddle 23 limits the extent of downward swing of arm 20 in a direction to disengage from ratchet 19. The biasing effect of weighted arm 29 may be adjustably varied by moving said arm to different angular positions in relation to arm 20. A bolt 32 extends through curved slot 33 in the sector shaped end of arm 20 and provides means whereby weighted arm 29 may be releasably secured to arm 20 in any desired position of angular adjustment in relation thereto.

Although weighted arm 29 normally holds arm 20 in yielding ratchet engaging position and thus prevents free rotation of roll 12, the free end of said weighted arm may be lifted by hand and thus release said ratchet 19 to free roll 12 when block 9 and the flexible band are drawn back to starting position under the conditions previously described.

The purpose of adjusting saddle 23 along bar 24, as above described, is to accommodate the stack feed to handle cards of different guage or thickness, because, under some conditions, heavy or thick cards will be needed, whereas cards of lighter weight stock will serve well enough for other purposes.

As shown in Figures 2 and 3, the bar 24 on which saddle 23 is mounted is pivotally connected at 36 to an arm 34 fast on rock shaft 35. A similar bar 24*a*, Figure 1, is similarly mounted with its free end supported in a slot in bracket 28*a*, Figure 1, at the opposite side of the machine from that shown in Figure 3 and carries devices for actuating said retaining arms 65 and/or other devices in a manner and for purposes to be described. Thus, when rock shaft 35 is actuated, as hereinafter set forth, said bars 24 and 24*a* are periodically reciprocated endwise, whereby bar 24 effects operation of the stack feed and bar 24*a* performs the other functions above suggested.

*Card picker mechanism*

In the illustrated machine, a suitable picker device functions in proper timed relation with operation of the stack advancing means above described, preferably so that each successive outermost or exposed card of the stack to be sensed is in a predetermined position from which it may readily be displaced by operation of the picker and thus started toward sensing position.

One form of picker conveniently usable in connection with the sensing devices employing air pressure differential and as hereinafter described is of the suction, vacuum or negative pressure type. An illustrative embodiment of such a picker and its operative connections is shown more clearly in Figures 1 and 6.

Referring to Figure 6, the picker comprises a suction tip 39, preferably of soft rubber arranged with its open end exposed toward the outermost or leading card of the stack of cards supported in the holder and in a position to engage an unperforated portion of the outer face of said card. Its other end engages a hollow fitting 40 having a hollow stem portion 41 slidably supported in a bracket 42 secured on cross rods 58 and 59. A flexible tube 43 of rubber or other suitable material connects said stem 41 and the interior of said fitting with a vacuum or source of reduced or negative air pressure maintained or produced by any suitable or well known means (not shown); and said tube is opened or closed by a clamp as 43*a*. Said fitting 40 is provided at its suction tip end with a relief port 44 normally closed by a cap 45 and has an enlarged chamber 99 connected to the port 44 and the interior of suction tip 39 by a duct or passageway 100 of relatively small diameter, i. e. smaller than the diameter of the stem 41 and the diameter of the port 44.

Said fitting 40 is actuated to slide toward and away from the stack by a cam 46 on a cam shaft 47 engaging a cam follower 53 on an arm 48 pivoted at 49 on a cross rod 50 supported between frame plates 57 and 57*a* which are held in spaced relation by said cross rods 58 and 59. A link 51 connects the upper end of arm 48 with a lug 52 extending downwardly from the hollow fitting 40. Cap 45 is normally held closed by a spring 54 secured to the underside of a trip arm 55 mounted on bracket 42 with its free end passing above cap 45. Said cap has a lug 56 extending upwardly and opposite the free end of trip arm 55.

A spring 57 biases fitting 40 in a direction to move suction tip 39 away from the stack when cam 56 is turned by shaft 47 to bring one of the re-entrant edge portions 46*a*, 46*b*, Figure 6, into engagement with cam follower 53, Figure 1. When fitting 40 is thus retracted and tip 39 reaches its predetermined card releasing position, Figure 1, lug 56 is engaged by the free end of trip arm 55 and tilted back to swing cap 45 and open port 44. This momentarily exhausts the vacuum in said tip, without however materially reducing the air pressure differential between the tip and the source, due to the restricted connection 100 between said port 44 and chamber 99. Thereupon, the leading card, which has been drawn away from the stack by the vacuum operating through tip 39 when fitting 40 is retracted, is released from said tip upon breaking of the vacuum therein when cap 45 is raised; and said card drops into a path between lateral card guides 60 and 61. Said picker operating cam 46, Figure 6, is mounted on cam shaft 47 which also carries a card stack advancing and sensing pressure differential control cam 62 and a card discharging cam 91, Figure 3, to be described. Rotation of said shaft 47 and therefore of cam 46 is timed to operate the picker and open the vent port 44 in proper relation to the operation of the previously described stack feeding devices and to other devices to be described.

It is contemplated that any suitable picker or other effective card separating or feeding mechanisms may be substituted for those above described to meet varying conditions of use, and the choice thereof may depend on such circumstances as the presence or absence of a suitable power supply, or on other controlling factors.

*Card sensing*

The record card, as 1*a*, Figures 5 and 6, after separation from the stack, as above described, is brought between the guides 60 and 61 to operative sensing position with its bottom edge resting on a swingable shelf 63, Figure 6, where, in one form of device, it is releasably held for sensing by arms 65 having end portions bearing lightly against portions of its outer face.

Said arms 65 are carried on a transverse rockable rod 66 mounted with its ends journaled in end portions of the bars 24, 24*a* and actuated periodically in a manner and at a time to be described. Beneath said sensing shelf is a card guiding and receiving device, including partitions 97 having end portions extending into slots 98 in the free edge of shelf 63, and thereby in effect separating one card receiving compartment, as A, from another, as B; compartment A, for example, being for "unwanted" cards and compartment B for "wanted" cards.

Assuming that one wishes to select out of the stack all cards or any card having one or more perforations disposed in a predetermined relation to the card and/or to each other, regardless of the presence or absence of other perforations, means are provided whereby a pneumatic force or air pressure differential is so applied when said cards are brought one after another into sensing position that the "unwanted" cards may be displaced or have their condition modified directly as a result of the applied force and the "wanted" cards are left undisturbed thereby. If, for example, the "wanted" record cards are identified by a single perforation located in some predetermined specific relation to the card and/or by a plurality of perforations forming in effect a pattern arranged in some predetermined specific relation to the card and to each other, sensing is effected, in the machine illustrated, by air pressure differential selectively applied through a sensing control or key member or card having a perforation or perforations forming the control perforation pattern for said "wanted" cards.

Thus, when a "wanted" card is in sensing position, each perforation of the key card will register with a corresponding perforation of the record card pattern; and the air jets defined by said perforations of the key card will blow through said perforations of both cards without effect on the record card. However, when an "unwanted" card is in sensing position, one or more perforations of the key card will register with one or more unperforated portions of the record cards; and the jet or jets defined by a perforation or perforations of the key card will impinge against one or more of said unperforated portions of the record card and thereby displace the latter, which is thus determined to be one of those not "wanted." Obviously, the use of the terms "wanted" and "unwanted," as above, is arbitrary and not intended to imply any limitation of function, but only to illustrate a manner of using one embodiment of the invention as a sorter.

*Key card and mounting*

To determine the number and relative positions of air jets, for example, to be applied for sensing on the basis of any given identifying or selective perforation pattern, a key member, shown in Figures 5, 6 and 10, as a key card 67, and as a band or strip 68 in Figures 1, 2, and 14, is operatively interposed between an air pressure differential manifold or chamber 69, Figures 6, 7, 8 and 11, and the record cards 1*a* or 1*b* resting in sensing position.

Said key card 67 has perforation receiving spaces or areas conveniently indicated by markings 123, Figure 5, corresponding in location to the perforation receiving spaces or loci of record card 1*a* and to air ducts 70 in a face plate 71, which may, advantageously, for some purposes, be made of a transparent material, as a plastic, or any other suitable material. The number and arrangement of said ducts 70 in face plate 71 may be varied in different embodiments to adapt the machine to different conditions or circumstances of use. In general, however, the number and arrangement of ducts 70 will preferably be the same as the number and arrangement of perforation receiving spaces provided on the record cards and the key member. Said face plate 71 also has low projections 125 on its outer surface which by spacing the record card from the openings of ducts 70 serve to prevent any Bernoulli effect when the record card is sensed by air pressure.

Any desired identifying perforation pattern of the "wanted" record card or cards, for example, is punched or otherwise effected in the corresponding spaces of a key card 67, or of key strip 68, as the case may be. All other spaces in the perforation receiving area thereof remain unperforated.

In the operation of one embodiment for sensing by reference to any given or selected pattern set up in terms of perforations, as 165 in said key card 67, Figure 5, the latter is positioned at the inner side of face plate 71 with its key perforations in register with the corresponding ducts 70 of said plate. Thus, when a record card 1*a* is in sensing position lying at the outer and slightly inclined side of face plate 71 and compressed air is admitted to chamber 69 from any suitable or well known source, not shown, it jets only through the key perforations 165 in the key card 67, and hence, only through the ducts 70 and the perforations in card 1*a* in register therewith.

If the record card to be sensed, as 1*a*, is one having a perforation in register with each of the correspondingly located perforations in the key card, the jets pass through without effect on the record card 1*a*. If, however, said sensed card presents one or more unperforated spaces in the path of one or more of said jets, said record card is displaced by such jet or jets in relation to shelf 63 and outwardly toward the dotted line position, Figure 6, for example, said outward movement being limited by suitable means, as the arms 65 in extended position, shown dotted.

Said arms 65, Figure 10, turn with rod 66 from the "in" position, Figure 1, to said "out" position (dotted) Figure 6, substantially along with the operation of said air jets. For this purpose, an arm 72 is fast on that end portion of rod 66 which is journaled in bar 24*a*, Figure 1. A set screw 73 is threaded in the web of bracket 28*a* and with an end adjustably positioned to engage said arm 72. A spring 74 biases said arm toward set screw 73. Thus, when the bars 24, 24*a* are simultaneously thrust outwardly by the operation of cam 62 and other parts to be described, said arm 72 is tilted clockwise by set screw 73, which rocks rod 66 and swings arms 65 to "out" position, Figure 6. Adjustment of set screw 73 toward and away from arm 72 produces equivalent variation in the time and/or extent of rocking movement of rod 66 and arms 65 thereon.

To periodically produce a condition of air pressure differential, as positive pressure in said chamber 69 and thereby the jetting effect above described, Figures 6, 7, 8, an air tube 75 passing through portions of block 76 has one end opening into chamber 69, the other end being connected with two branch tubes including a supply tube 77 which has a flexible and compressible portion of rubber, for example, and is connected to a suitable source of pneumatic force, as air under pressure, not shown.

Said compressible portion of tube 77 passes through opposed slots 78 provided in the bifurcated bracket 79. A rockable hook shaped tube retainer 80 pivotally mounted in said bracket at 81 and between said slots 78 is tiltable by a handle 82 to and from the positions shown in Figures 7 and 8 for a purpose to be described. So far as the mechanism presently considered is employed to operate primarily as a valve for periodically controlling or turning on and off the supply of air under pressure to chamber 69 to produce jetting for sensing, it will be assumed that tube retainer 80 occupies the position shown in Figure 7.

Referring to said Figure 7, tube retainer 80 has a wall portion providing a stop 83 against which tube 77 is shown as compressed to closed condition by an end portion of a depending arm 84 fast on rock shaft 35. To control the angular position of said arm 84, a cam follower 85 thereon engages cam 62 on shaft 47, previously referred to in connection with operation of the stack advancing mechanism. Said cam 62 has re-entrant portions 62*a* and 62*b*. Thus, when cam shaft 47 is rotated, in normal sensing operations, to bring one or the other of said re-entrant portions 62*a*, 62*b* thereof into engagement with said cam follower 85, the lower end of arm 84 is freed to swing away from stop 83. Thereupon, pressure in the up stream portion of tube 77, that is, between the arm 84 and the source of air under pressure, not shown, forces the lower end of said arm 84 in a clockwise direction, Figure 7. This permits the free passage of air pressure through said tube 77 and into manifold or chamber 69. Continued rotation of cam shaft 47 returns the arm 84 and connected parts to the relative positions shown in Figures 6 and 7.

Referring back to the previously described stack advancing mechanisms, it will be clear that, in a typical sensing cycle, the stack feed actuating bar 24 is thrust forward to turn stack feed roll 12 approximately when arm 84 swings to release or open tube 77; and is retracted when said arm 84 is returned to its tube compressing or closing position, Figure 7.

Reviewing the operation of parts thus far described and starting with said parts in the relative positions shown in Figure 6, rotation of cam shaft 47, clockwise for example, first brings re-entrant portion 46b of cam 46 into engagement with cam follower 53 on arm 48. This operates the picker to release record card 1a which drops into sensing position. Next, re-entrant portion 62a of cam 62 is brought to engage cam follower 85 on arm 84. This releases air pressure into the chamber 69 to cause jetting; thrusts bar 24 in a direction to feed the stack toward the picker in preparation for the next pick; and thrusts bar 24a in a direction to rock arm 65 to the dotted line or card releasing and guiding position, Figure 6.

The final step in the sorting cycle is to discharge or pass the sensed card out of sensing position and into one or the other of the compartments A, B, Figure 1, depending on whether, as a result of the sensing operation the condition of the card has been changed, for example, displaced by a jet or jets of air, toward the dotted line position, Figure 6, or has remained unaffected thereby or unmoved from its original sensing position, shown in full lines.

It is contemplated that any suitable valve or equivalent mechanisms other than those herein described may be employed to control the supply of air pressure differential, whether for picking, sensing, or other disclosed purposes.

*Discharge of sensed cards*

In using the illustrated embodiment for sorting, the sensed cards are discharged one after another from their position on the shelf 63, Figure 6, by periodically swinging said shelf counterclockwise. For this purpose, said shelf has end lugs 64, Figure 3, suitably journaled to support the shelf in approximately the position shown. An arm 86, fast on one of said lugs 64, is connected by a link 87 to one end of a cam actuated arm 88, the opposite end of which is pivoted at 89. A cam follower 90 is carried on arm 88 which is biased by spring 92, Figure 3, in position to be engaged by a cam 91 fast on shaft 47, said spring having one end (top) secured to cross brace 93, Figure 2. Said cam 91 has re-entrant portions 91a and 91b arranged at an angle to operate shelf 63 in proper timed relation to operation of the parts controlled by cams 46 and 62, previously described. Thus, following the sensing of each record card 1a, shelf 63 is swung downwardly in a manner to discharge said card, if displaced (dotted Figure 6), into compartment A, or if not displaced (full line) into compartment B.

In the illustrated embodiment, it is contemplated that the cam shaft 47 may be hand operated, as by a crank 94 secured to an end thereof, or may be turned by any other suitable means. As appears from the foregoing, such rotation of cam shaft 47, however accomplished, produces the successive cycles of record card feeding, sensing, and discharge in the order previously described.

*The key card*

In the embodiments shown the key member may be a key card, as 67, Figure 10, or a key strip as 68, Figure 2. One form of key card 67, as shown in Figure 5, has an area 101 marked in any suitable manner, as by circles 123, to identify perforation receiving spaces or loci which correspond in number and arrangement with similar markings 124 of the record card, 1a, Figure 5, or 1b, Figure 12. Key card 67 which may be of paper or other suitable material has a guide hole 102 which, when utilized as hereinafter described, aids in centering and properly retaining the key card in sensing position.

*The key strip*

Where a strip, as 68, Figure 2, of paper or other suitable material is employed to provide key members in sensing, it is wound in a roll on a spool 103 having a knurled cap 104 by which the spool may be turned manually on an upright spindle 105, preferably with enough frictional resistance to hold the web of said strip in taut condition when in sensing position. Markings indicating perforation receiving spaces or areas corresponding in function to similar markings 123 on card 67, Figure 5, may be printed or otherwise provided on one face of said strip 68; and the strip may have a succession of suitably spaced positioning holes as 102a, Figure 6, corresponding in function to the holes 102 in the key cards 67. If the device is one wherein the required perforations may be made in situ, as shown in Figure 9 for example, a key strip 68 without the prior markings 123 may be used.

In assembling the parts for sensing, the free end of strip 68 is engaged with another spool 103a having a knurled cap 104a, Figure 2, and mounted to be turned by hand in like manner to spool 103. The web of said strip 68 between spools 103 and 103a passes over guide rolls 106 and lies between the record card and manifold or chamber 69, Figure 6; so that, in use, the key perforations in the strip when properly positioned will register effectively with similarly positioned perforations in the record card.

*Key member positioning and retaining devices*

In the form of apparatus shown in Figure 6, for example, i. e. where the key card, as 67, or a portion of the key strip, as 68, is pre-punched or provided with the desired perforation pattern before being positioned for sensing, a centering or key positioning plunger 107 is mounted to be moved in a passageway in block 76 so that its free end will pass through the holes 102, 102a as the case may be, and into and out of centering hole 108 in face plate 71, Figures 5 and 6. To actuate plunger 107, a lever 126, pivoted at 127 has a finger piece 128 at its top or exposed end and a slot 129 near its lower end. A pin bolt 130 threaded in a recessed portion 131 of plunger 107 extends through slot 129 and operatively connects the lower end of lever 126 with said plunger 107. Thus the operator may properly position the key member by oscillating the finger piece 128, until plunger 107 passes freely into hole 102 or 102a which indicates that the card or strip is in proper position.

When the key member has been centered or properly positioned in relation to plate 71, the latter serves to clamp key card 67 on a portion or strip 68 in sensing position and against flat face portions of block 76 so that there will be no undue leakage of air from the chamber 69 in the jetting phase. Plate 71 is, therefore, supported by a slidable frame, shown in Figures 6 and 10 as comprising a pair of spaced upper slide bars 109, a pair of spaced lower slide bars 110, an upper connecting bar 111, and a lower connecting bar 112. End portions of said upper and lower slide bars are secured to top and bottom edge portions respectively of the face plate 71. Top connecting bar 111 has a slot at one end which engages a pin 113 extending upwardly from one of said top slide bars 109. A similarly mounted pin on the other of said slide bars 109 forms a pivotal connection at 114 with said top connecting bar 111. Lower connecting bar 112 is connected in the same way with lower slide bars 110.

Upper connecting bar 111 is provided with a cam follower 115 and lower connecting bar 112 with a cam follower 116, said followers being mounted at the upper and lower ends, respectively, of an upright shaft 117. An upper cam 118 and a lower cam 119 are secured to a vertical shaft 120 journaled in block 76 and actuated by a hand lever 121.

A leaf spring 122, secured to the rear wall of block 76 is arranged with its free end bearing against a mid portion of shaft 117, thus normally biasing face plate 71 outwardly, or to open or unclamping position. Upper cam 118 bears against cam follower 111 and lower cam 119 against cam follower 112 to force the face plate 71 into key member clamping position against resistance of spring 122 when the parts are in the relative positions shown in Figures 6 and 10. This arrangement is maintained during sensing. By swinging hand lever in either direction from that shown in Figures 6 and 10, for example, cams 118 and 119 are turned correspondingly; and spring 122, bearing against shaft 117, causes face plate 71 to move outwardly to key card releasing or unclamping position, or so that a key card may be readily inserted or removed.

*Punching key member in situ*

An embodiment shown in Figures 7 and 8, which illustrates a modification as to part of the machine, provides means whereby the key member or a portion thereof may be perforated after it has been positioned in operative relation to plate 71 and chamber 69. Accordingly, a die plate 132 having holes 133 suitably shaped for the purpose is positioned between face plate 71 and chamber 69 and with said holes 133 opposite the ducts 70 in plate 71.

Any suitable means may be employed with die plate 132 to perforate the key member, as strip 68, Figure 9. As there shown, a hand punch 134 is shaped at one end to engage and pass through the ducts 70 of plate 71 and the holes 133 of die plate 132 in register therewith. With the parts properly formed, the reduced end of hand punch 134 will be forced through the sheet 68; will cut portions, as 135, therefrom; and will push said pieces 135 into chamber 69.

*Blow out device*

To prevent cut or punched out pieces, as 135, Figure 9, from wholly or partially blocking any of the holes 133 during sensing, means are provided for displacing said pieces from chamber 69 by pressure or suction. For control of blowing them out through a port 136 connected to chamber 69 and an opening forming a valve seat 137, a valve bolt 138 having a handle 139 is mounted in a recess in block 76 with its inner end opposite valve seat 137. A pin 140 on bolt 138 engages an inclined or helical slot 141 in the surface of the bolt recess. Thus, when the parts are in the relative positions shown in Figure 7, i. e. for sensing, port 136 can be opened by turning handle 139 until pin 140 on bolt 138 disengages slot 141 which frees said bolt to be withdrawn to open position, as shown in Figure 8. The operation is reversed to close port 136.

When port 136 is open, particles as 135, or the like are blown out by admitting air under pressure to chamber 69 through pipe 75, Figure 6, and the valve including compressible tube 77, Figures 7 and 8. Handle 82 is rocked from down position, Figure 7, to up position, Figure 8. This permits tube 77 to expand and pass air under pressure into chamber 69; and it is contemplated that the consequent air stream passing out through port 136 will carry along all punched out pieces or the like. Handle 82 is then returned to down position, Figures 6 and 7, and that portion of the machine is ready to begin sensing operation.

*Sensing by suction*

In a modification as shown in Figures 11 and 12, the sensing mechanism includes chamber 69 at one side of a block 151 provided with ducts 152 which are each of smaller cross section than the record card perforations but substantially the same area as the ducts 154 of plate 153 and the key member perforations as 149. Said plate 153 serves in part to retain key member, as strip 68, in operative position; and the ducts 154 in said plate register with the ducts 152 in block 151 and perforations 149 in key strip 68. Said ducts 154 are flared at their outer end openings to form shallow suction recesses 155 at the outer side of plate 153, said recesses being preferably of the same diameter or opening area as that of the perforations 2*b* or 2*c* in record card 1*b* but not larger than said perforations.

A record card retainer, shown in the form of a plate 156 having ducts 157 arranged to come opposite the recesses 155 in plate 153 and perforations in card 1*b* when in sensing position is pivotally supported at 158 by spaced arms 159 fast on a transverse rod 160 journaled in the bars 24, 24*a*. Spaced brackets 161 on plate 156 have portions embracing intermediate parts of arms 159 to permit moderate adjusting rocking movement of plate 156 as it moves into card retaining position. A set screw 162 threaded in a portion of bracket 28*a* operates as a trip to actuate arm 159 which is biased toward full line position, Figure 14, by spring 163.

As in previously described embodiments, an edge of the record card 1*b* to be sensed, rests on or against the guide or shelf 63 and a face of said record card is momentarily held by plate 156 against the outer face of said plate 153 during sensing. While said parts are in this position, continued turning of cam 62, Figure 6, swings arm 84 in a direction to open tube 77, in the present instance connected to a vacuum source, not shown, instead of to pressure. This, through tube 75, produces suction in chamber 69 and in the shallow recesses 155 through the ducts 152 which are of smaller diameter than said recesses.

If all of the perforations in key member 68 are opposite perforations in record card 1*b* the position and other conditions of said card will remain initially unchanged; but as soon as shelf 63 starts to swing down toward dotted line position, Figure 11, actuated by means previously described, and as retainer plate 156 is swung outward to dotted position, the lower edge of card 1*b* slides down and outwardly along shelf 63 and is stripped therefrom and diverted into compartment A by the partition member 97.

If however any perforation in key member 68 is opposite an unperforated space of record card 1*a* when retainer plate 156 is swung outwardly to release said record card 1*a*, as above described, suction produced in the corresponding suction recess 155 will operate through a perforation, as 149 of key member 68 in register with said recess 155, in effect to bias said record card 1a toward the key member 68 and so hold card 1a in its initial sensing position until shelf 63 reaches end position (dotted line) on its down swing, whereupon the suction is released and the sensed card drops into compartment B.

It will be understood that by proper timing of the swing of retainer plate 156 in relation to the starting and stopping of air pressure differential or valve opening and closing movements of arm 84 and cam 62, the mode of operation above set forth is readily achieved.

*Sensing for sorting or other useful purpose*

In a further modification, shown in Figures 13 to 16, the sensing mechanism includes a front stop plate 142 having holes 143 in regular arrangement corresponding to perforation spaces in the record cards and the key member. A plate 144 having holes 145 acts as a rear stop or screen and separates the manifold or chamber 69 from a plunger chamber in which one or more rows of piston-like plungers 146 of rectangular or other suitable cross sectional area are mounted in such relation that each is freely slidable in relation to contiguous plungers with substantially no leakage of air between them when air under pressure is admitted to chamber 69 through tube 75. The outer face of plate 142 is recessed at 166 to form in effect a guide channel for key member 68.

A pin 147 extends from the forward end of each plunger 146. As seen in Figure 15, any one or more of said plungers may be operated as desired to cause said pin to actuate other devices of variout kinds such for example as a switch or switches 148 controlling a relay circuit, not shown, in any well known manner to effect a useful result.

Said plungers 146 or some of them are also adapted to implement the pneumatic force in sensing for sorting, as by moving or not moving the record card 1a from full line to dotted line position on shelf 63 whence it may be selectively discharged by devices previously described.

In sensing for sorting, when a card 1a is held in sensing position, i. e. resting on shelf 63 and pressed toward key member 68, and pneumatic force as air pressure is applied through chamber 69, the plungers 146 or some of them will under some conditions be thrust endwise in a direction away from screen 144 toward card 1a. Thus, where a pin, as 147a on any of said plungers is opposite a perforation, as 149, in key sheet 68, the end of said pin is thrust through said perforation. If the record card 1a also presents a performation, as 2, in register with said pin 147a, the end thereof moves through that and beyond the card without displacing the card on shelf 63 or otherwise changing its condition. If, however, card 1a has no perforation registering with said perforation 149 in the key member, the end of pin 147a pushes said card toward the dotted line position, Figure 13. The extent of outward movement of the plungers and pins is limited by front end faces of the plungers coming against the inner face of front stop plate 142.

Where a pin as 147b is opposite an unperforated portion of key sheet 68 when the air pressure is applied in sensing, the end of said pin merely moves into engagement with the key member and has no effect on the record card or any extraneous devices.

Thus, the modification shown in Figures 13 to 16 illustrates a form of pneumatic sensing device which may be used effectively both as a sorter and for other useful work, as operating a counter for example.

Means are also provided for periodically returning said plungers automatically from any advanced position to retracted position after each sensing thrust. As seen in Figures 6 and 7, a suction tube 150 of rubber or other suitable material and connected to a source of vacuum or low pressure, not shown, has a compressible portion positioned between the lower end of arm 84 and a free end portion of tube retainer 80. Tube 150 is joined with tube 77 at a point between said arm 84 and inlet tube 75, Figure 6. Thus, when said arm is in the position shown in Figure 7, i. e. while shutting off the pressure line 77, vacuum or low pressure tube 150 is open. The resulting lowered pressure or suction created in chamber 69 operates to pull plungers 146 back to retracted position, i. e. with their rear ends against the screen or rear plate 144, where they remain until cam 62 again brings a re-entrant portion 62a and 62b thereof into engagement with cam roller 85.

With the air pressure differential control arrangement above described, suction tube 150 may also be employed to suck out from chamber 69 the punched out particles 135 in an embodiment where the key member is perforated in situ, as previously described. In such case with port 136 open, handle 82 is swung to the position shown in Figure 7. This opens suction pipe 150 and loose pieces of paper or other particles in chamber 69 are entrained and sucked out through pipe 75 and suction tube 150.

*Summary*

Sensing mechanisms according to the foregoing description are capable of effective and advantageous use in many fields both where punched record cards are now commonly employed and where various circumstances have heretofore prevented or unduly limited such use. One outstanding advantage of the present invention is that, with the same simple device, sorting may be made on the basis of one or any practicable greater number of distinctive or identifying features or facts set up in terms of perforations on the record cards. For example, in reports or records dealing with personnel, insurance, credit, vocations, merchandise and many other subjects, much of the information is recorded by "yes" or "no," or by some simple alternative, as "black" or "white." These facts are conveniently represented by perforations in the record card. It is obvious that any combination, from a single perforation representing one identifying fact for example, to any number of perforations representing all the facts recorded, can be set up on the key card or strip and used to sort the "wanted" cards in a stack from the "unwanted" cards. The invention therefore provides a machine capable of greatly extending the usefulness of facts, knowledge, data, etc., recorded in terms of perforations by making them readily available in any desired range from broadly generic to narrowly specific. The field of use extends from small private offices and enterprises to large businesses, libraries and government agencies of the most extensive scope.

The foregoing advantages are realized whether the sensing apparatus be of the "pressure" or the "suction" type; whether it is employed merely for sorting, or for additional uses; whether the key member is a card, a strip, or other suitable equivalent element; or whether the key member is pre-perforated, that is, provided with a pattern of perforations before being positioned in the sensing mechanism, or is perforated thereafter to control sensing. The described variations in application of the key member principle, and as represented in the drawings, are not intended to preclude different arrangements embodying that concept to facilitate its employment under different conditions.

We claim:

1. In apparatus for sensing, as in selecting, sorting, or otherwise utilizing record cards, or the like, having some portions which provide indicia in the form of perforations and other portions which are unperforated, the combination of means for supporting a key member which presents a sensing control pattern in the form of one or more perforations, means for delivering record cards singly into sensing position in relation to said key member, means for releasably supporting said cards singly in said sensing position, means effective in sensing for supplying a pneumatic force operative in a direction through the perforation pattern of said key member to change or not change the position of each said record card in relation to said supporting means, depending on the relation between the perforation pattern of said key member and the perforated and unperforated portions of said record card, and means for actuating said releasable card support to discharge said record card therefrom in one direction or another depending on the position of said card thereon.

2. In apparatus for sensing, as in selecting, sorting, or otherwise utilizing record cards, or the like, having some portions which provide indicia in the form of perforations and other portions which are unperforated, the combination of means for supporting a key member which presents a sensing control pattern in the form of one or more perforations, means for releasably supporting a record card at one side of said key member, means for applying suction at the opposite side of said key member, and means operatively connected with said suction applying means for moving said card supporting means toward card discharging position while suction is being applied, whereby some cards will move toward discharged position during said movement of the supporting means and other cards will move toward discharged position only after suction has ceased to be applied.

3. In apparatus for sensing, as in selecting, sorting or otherwise utilizing record cards having some portions which present indicia in the form of perforations and other portions which are not perforated, the combination of a wall provided with perforations, means for supporting a perforated record card at one side thereof and with perforated portions of said card in register with one or more perforations of said wall and unperforated portions of said card disposed opposite other perforations of said wall, means for supporting a key sheet having perforated portions arranged in relative positions corresponding to perforated portions of a record card at the other side of said wall and with perforated portions of the sheet in register with perforated portions of said wall, unperforated portions of said sheet being positioned opposite other perforated portions of said wall, means for delivering compressed air in a direction to pass jets thereof through perforations in said key sheet and perforations in said wall registering therewith, whereby an air jet passing through a perforation in the key sheet will discharge through a correspondingly positioned registering perforation in the record card, or against a correspondingly positioned unperforated portion thereof and thereby displace said card from its initial position to a different position in relation to said card supporting means, and means for actuating said support to discharge the record card therefrom in one direction if from its initial position thereon and in another direction if in said different position thereon.

4. In apparatus for sensing, as in selecting, sorting or otherwise utilizing record cards having portions some of which present indicia in the form of perforations and other portions which are not perforated, the combination of means for supporting a key sheet having perforated portions arranged in relative positions corresponding to perforated portions of a record card, means for supporting a perforated record card at one side of and in operative relation to said key sheet, means for delivering compressed air to the other side of said key sheet in a direction to pass jets of air through perforations therein whereby an air jet passing through a perforation in the key sheet will discharge through a correspondingly positioned opposed perforation in the record card in register therewith without changing the position of said card or against a correspondingly positioned opposed unperforated portion thereof and thereby displace said card in a direction away from said key sheet, and means for moving said card supporting means from and to record card supporting relation to said key sheet.

5. In apparatus for sensing, as in selecting, sorting or otherwise utilizing record cards having portions presenting identifying indicia in the form of perforations and other portions which are not perforated, the combination of means for supporting a key member having perforations arranged in relative positions corresponding to perforated portions of a record card, card supporting means arranged and adapted to engage and support an edge portion of a record card with perforations and imperforated portions of said record card in operative relation to said perforations of said key member, and means operative through one or more perforations in said key member in a direction toward said card to engage an unperforated portion thereof and thereby displace said card in relation to said card supporting means.

6. In apparatus for sensing, as in selecting, sorting or otherwise utilizing record cards having portions presenting identifying indicia in the form of perforations and other portions which are not perforated, the combination of means for supporting a key member adapted to provide a sensing control pattern in the form of one or more perforations, movable means for releasably holding a record card in operative position for effecting a comparison of its identifying indicia with the sensing control pattern of said key member, means operative through said sensing control pattern of the key member and movable into engagement with an unperforated portion of said record card while said card is held in said comparing position and arranged and adapted to change the position of said card in relation to said releasable holding means, and means arranged and adapted to actuate said card holding means in a direction to discharge said card from its changed position in relation thereto.

7. In apparatus for sensing perforated record cards by reference to a perforated key card, the combination of means for releasably supporting said key card, means for releasably holding a record card in sensing relation to said key card and movable in realtion thereto when the latter is supported by said key card supporting means, a plurality of plungers mounted to slide one upon another and movable endwise in a direction toward and from said key card and having end portions positioned and adapted to pass through perforations of said key card and to be stopped by unperforated portions thereof when said key card is supported by said key card supporting means, and means arranged and adapted to move said plungers through perforated portions of said key card and against unperforated portions of said movable record card which are in register with perforations of said key card to move said record card in relation to said record card holding means.

JAMES M. BOYLE.
JOHN W. THOMPSON.

REFERENCES CITED

The following references are of record in the file of this patent:

UNITED STATES PATENTS

| Number | Name | Date |
|---|---|---|
| 1,287,142 | Trew | Dec. 10, 1918 |
| 1,482,198 | Lebeis | Jan. 29, 1924 |
| 1,572,809 | Ratcliff | Feb. 9, 1926 |
| 1,621,716 | Geiger | Mar. 22, 1927 |
| 1,838,389 | Goldberg | Dec. 29, 1931 |
| 1,876,038 | Belisle | Sept. 6, 1932 |
| 2,030,405 | Schaaff | Feb. 11, 1936 |
| 2,167,871 | Boylan | Aug. 1, 1939 |
| 2,269,894 | Cleven | Jan. 13, 1942 |
| 2,319,108 | Broido | May 11, 1943 |
| 2,411,645 | Whetstone | Nov. 26, 1946 |

FOREIGN PATENTS

| Number | Country | Date |
|---|---|---|
| 502,536 | Great Britain | Mar. 16, 1939 |
| 739,510 | France | Nov. 3, 1932 |
| 580,675 | Germany | July 19, 1933 |